United States Patent Office.

CLYDE A. RICKARD AND EDWARD N. LONG, OF SEVILLE, OHIO.

ART OF TREATING TOBACCO-LEAVES.

SPECIFICATION forming part of Letters Patent No. 604,338, dated May 17, 1898.

Application filed October 18, 1895. Serial No. 566,129. (No specimens.)

*To all whom it may concern:*

Be it known that we, CLYDE A. RICKARD and EDWARD N. LONG, citizens of the United States, residing at Seville, in the county of Medina and State of Ohio, have invented a new and useful Art of Treating Tobacco-Leaves, of which the following is a specification.

This invention relates to the art of treating tobacco-leaves which are employed as wrappers for cigars; and it has for its object to provide a process for treating the leaves of a growing plant in such a manner and by such means as to provide for producing a wrapper of superior quality.

The invention contemplates the employment of chemicals or other agents applied to the leaf in isolated spots to provide for promoting the burning quality of the leaf, while at the same time leaving the leaf sufficiently soft and pliable, so as not to destroy the usefulness of the leaf as a wrapper for cigars. In carrying out this process it is to be observed that the fundamental feature of the invention is the application of the chemical agent to the leaf while the plant is growing; but the chemical agent employed is intended to only partially deaden the leaf at the spots where applied, so that the chemical will be absorbed and assimilated throughout the entire leaf. This becomes very important when the chemical employed is such a chemical as potash, that would greatly increase the burning quality of the leaf when used as a wrapper, and it has been found that the chemical is more thoroughly distributed throughout the body of the leaf by applying the same to the leaf in spots and allowing the growing leaf to absorb and assimilate the chemical.

In carrying out the invention it has been found most desirable to employ, for the purpose of treating the leaf as described, chemicals belonging to the alkaline group, such as potash, and at the same time such chemicals as have a considerable affinity for water, so that the leaf will only be partially deadened at the spots of application, whereby sufficient vitality will be left in such spots to allow for the absorbtion and assimilation of the chemical throughout the leaf and to prevent the spots from becoming too brittle. These results are secured best by applying the combustion-promoting agent to the leaf while the plant is still growing at about the time the leaves have reached their maturity.

Referring more particularly to the agents employed, it is to be noted that such agents may be conveniently dropped on the leaves in spots by means of atomizers or other suitable apparatus; but however applied the best mixture found available for the purpose is a combination of potash and glycerin, the potash having the important property of promoting or increasing the burning quality of the leaf, while the glycerin maintains the spot soft and pliable, so as to maintain the usefulness of the leaf as a wrapper. Without intending to limit ourselves to specific proportions we would say that where the size of the drops sprayed upon the leaves varies from approximately the size of a pin-head to sizes still more minute solutions of caustic potash, (which may conveniently be made from the ninety-eight-per-cent. caustic potash, known commercially as "Babbitt's caustic lye,") varying from sixteen ounces to thirty-two ounces per gallon of water, may be employed to produce the desired result, either with or without the addition of glycerin in the proportion of, say, one pint of glycerin to ten gallons of the solution. For the thinnest leaves and upon bright sunshiny days the solution will preferably be the sixteen-ounce solution. For the thickest leaves and upon dark cloudy days the thirty-two-ounce solution will preferably be employed. Other agents may be such chemicals as absolute alcohol, with or without glycerin, lime, or the like; but it will of course be understood that any means may be employed for securing the two results emphasized—namely, the increasing of the burning quality of the leaf and causing the spots to remain soft and pliable.

Having thus described our invention, what we claim, and desire to secure by Letters Patent, is—

1. An improvement in the art of treating tobacco-leaves, which consists in applying a combustion-promoting agent to the leaves of a growing plant, substantially as described.

2. An improvement in the art of treating tobacco-leaves, which consists in applying an alkali to the leaves of a growing plant in spots, substantially as described.

3. An improvement in the art of treating tobacco-leaves which consists in applying a mixture of potash and glycerin to the leaves of a growing plant in spots, substantially as described.

In testimony that we claim the foregoing as our own we have hereto affixed our signatures in the presence of two witnesses.

C. A. RICKARD.
E. N. LONG.

Witnesses:
JOHN H. SIGGERS,
W. B. HUDSON.